US012769238B2

(12) United States Patent
Kawasaki et al.

(10) Patent No.: US 12,769,238 B2
(45) Date of Patent: Oct. 20, 2026

(54) IMAGE FORMING APPARATUS

(71) Applicant: BROTHER KOGYO KABUSHIKI KAISHA, Nagoya (JP)

(72) Inventors: Shuji Kawasaki, Nagoya (JP); Mikio Inuzuka, Okazaki (JP); Yoshiyuki Tsujimoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 19/216,188

(22) Filed: May 22, 2025

(65) Prior Publication Data

US 2025/0370389 A1 Dec. 4, 2025

(30) Foreign Application Priority Data

May 31, 2024 (JP) ................................ 2024-088824

(51) Int. Cl.

*G03G 15/00* (2006.01)
*G03G 15/01* (2006.01)
*G03G 15/043* (2006.01)
*G03G 21/16* (2006.01)

(52) U.S. Cl.

CPC ..... *G03G 15/5058* (2013.01); *G03G 15/0131* (2013.01); *G03G 15/0189* (2013.01); *G03G 15/043* (2013.01); *G03G 15/5054* (2013.01); *G03G 21/168* (2013.01)

(58) Field of Classification Search

CPC ........... G03G 15/5054; G03G 15/5058; G03G 15/0131; G03G 15/0189; G03G 15/043; G03G 21/168

See application file for complete search history.

(56) References Cited

U.S. PATENT DOCUMENTS

| | | | | |
|---|---|---|---|---|
| 2010/0272462 | A1 | 10/2010 | Murayama | |
| 2018/0113407 | A1* | 4/2018 | Takahashi | G03G 15/5054 |
| 2019/0033764 | A1* | 1/2019 | Kobayashi | G03G 15/5058 |
| 2024/0103399 | A1* | 3/2024 | Morikami | G03G 15/0855 |

FOREIGN PATENT DOCUMENTS

| | | | |
|---|---|---|---|
| JP | 2010-256715 | A | 11/2010 |
| JP | 2012-242754 | A | 12/2012 |
| JP | 2014-71307 | A | 4/2014 |

* cited by examiner

*Primary Examiner* — Joseph S Wong

(74) *Attorney, Agent, or Firm* — Merchant & Gould P.C.

(57) ABSTRACT

An image forming apparatus includes photoconductor drums, an endless belt, a sensor including a light-emitting unit and a light-receiving unit, a light emission adjustment circuit configured to change a light emission amount of the light-emitting unit in response to a control signal, a comparator circuit configured to compare a light reception signal level with a threshold level, and to output a comparison result signal indicating that the light reception signal level exceeds the threshold level, and a controller. The controller is configured to perform a light amount adjustment process of sequentially outputting the control signals with updating the adjustment value from an initial value by a search width, and determining an adjustment value that the light reception signal level exceeds the threshold level, and to set at least one of the initial value or the search width according to a deterioration state of the endless belt.

7 Claims, 10 Drawing Sheets

IMAGE FORMING APPARATUS

REFERENCE TO RELATED APPLICATIONS

This application claims priority from Japanese Patent Application No. 2024-088824 filed on May 31, 2024. The entire content of the priority application is incorporated herein by reference.

BACKGROUND ART

The present disclosure relates to an image forming apparatus including a sensor having a light-emitting unit configured to emit light toward a belt that conveys printing sheets, and a light-receiving unit configured to detect light reflected from the belt. The apparatus executes a light amount adjustment process by controlling the emission of light from the light-emitting unit based on a control signal, thereby improving the accuracy of optical detection used for various correction processes.

A known image forming apparatus includes multiple photoconductor drums arranged along a belt that conveys a printing sheet, and toner images of different colors are sequentially transferred from the respective photoconductor drums onto the printing sheet, thereby forming a color image. In such an apparatus, a sensor is provided to detect light reflected from the belt. The detected light amount is used for various correction processes, such as registration correction to prevent misalignment of transferred positions (i.e., color shifting) and density correction to ensure accurate color reproduction.

To ensure accurate detection of light reflected from the belt, the apparatus executes a light amount adjustment process, in which the amount of light emitted from the light-emitting unit is controlled based on a control signal. Specifically, the emission intensity is adjusted such that the reception signal level reaches a threshold, thereby optimizing the detection conditions.

SUMMARY

A conventional image forming apparatus typically executes the light amount adjustment process by gradually increasing the pulse width modulation (PWM) value of the light emission control signal from a particular initial value. The PWM value is increased in fixed increments until the reception signal level of the light-receiving unit reaches a particular threshold. However, when the reflectance characteristics of the belt change due to aging or wear, the difference between the initial PWM value and the threshold-determined PWM value increases. As a result, the time required to determine the appropriate PWM value becomes longer.

The present disclosure provides an improved method for performing the light amount adjustment process. The apparatus dynamically adjusts the initial PWM value and the increment width according to the degradation state of the belt, thereby reducing the time required to determine the optimal PWM value. By optimizing the light amount adjustment process, the accuracy of optical detection is enhanced, contributing to improved registration correction and density correction.

According to aspects of the present disclosure, an image forming apparatus including a plurality of photoconductor drums, an endless belt arranged at a position facing the plurality of photoconductor drums, a sensor including a light-emitting unit configured to emit light toward the endless belt and a light-receiving unit configured to receive light reflected by the endless belt, a light emission adjustment circuit configured to change a light emission amount emitted from the light-emitting unit in response to an input of a control signal indicating an adjustment value, a comparator circuit configured to compare a light reception signal level corresponding to a received light amount of the light-receiving unit with a threshold level, and to output a comparison result signal indicating that the light reception signal level exceeds the threshold level, and a controller having hardware. The controller is configured to perform a light amount adjustment process of sequentially outputting the control signals with updating the adjustment value from an initial value by a search width, and determining, based on the comparison result signal, the adjustment value the light reception signal level exceeds the threshold level. When executing the light amount adjustment process, the controller is configured to set at least one of the initial value or the search width according to a deterioration state of the endless belt.

DESCRIPTION

First Embodiment

Figure 1:
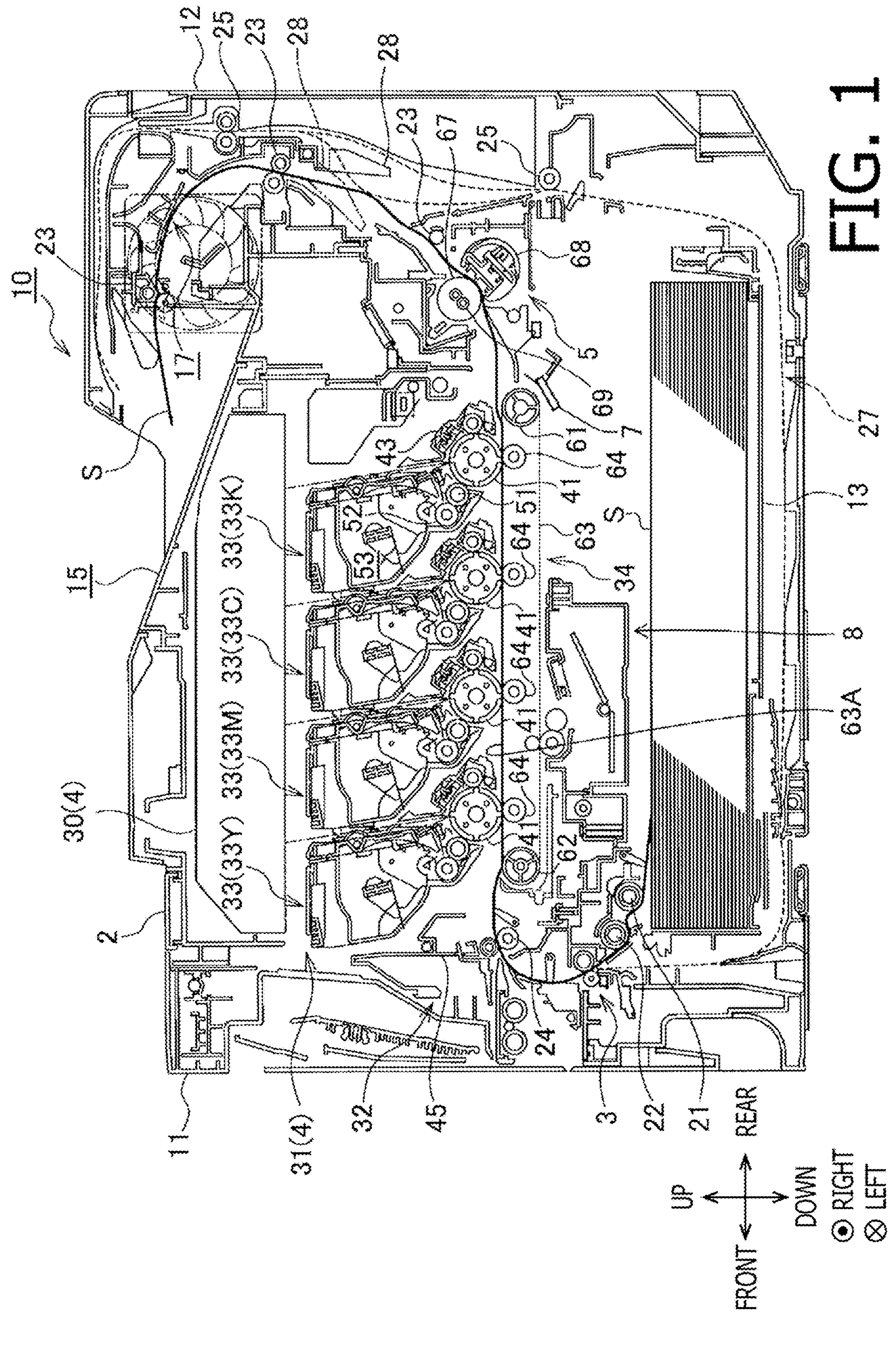
FIG. 1 is a cross-sectional view illustrating a schematic configuration of a color laser printer.
Figure 2:
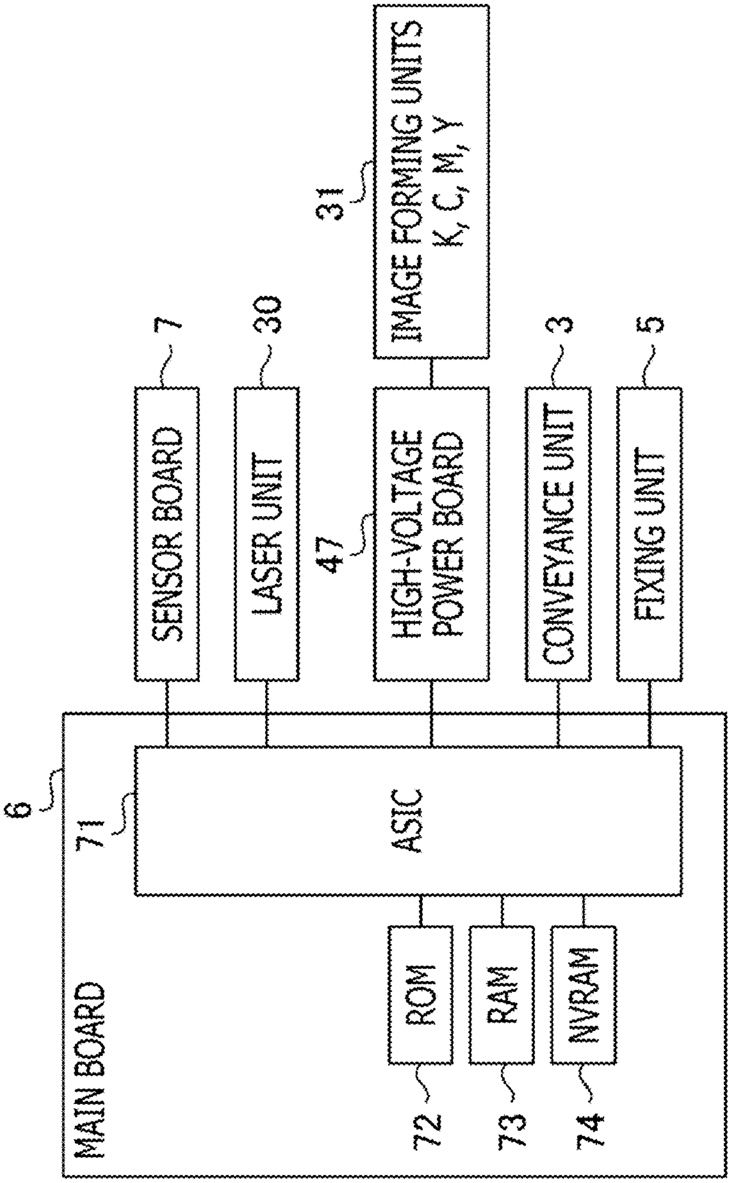
FIG. 2 is a block diagram illustrating a control configuration of the color laser printer.

The following describes a color laser printer as one embodiment that embodies the image forming apparatus of the present disclosure, with reference to FIGS. 1 and 2. FIG. 1 is a cross-sectional view of the color laser printer 10. FIG. 2 is a block diagram illustrating a control configuration of color laser printer 10. the color laser printer 10 is an example of an image forming apparatus of the present disclosure. Hereinafter, the "color laser printer" 10 is simply referred to as a "printer" 10.

As illustrated in FIGS. 1 and 2, the printer 10 includes a main housing 2, a conveyance unit 3, a process unit 4, a fixing unit 5, a main board 6, and a sensor board 7. For convenience of explanation, a vertical (up-down) and a front-rear directions of the printer 10 are defined as indicated by arrows in FIG. 1. Additionally, a near side of the drawing is defined as a right side, and a far side is defined as a left side of the printer 10.

The main housing 2 includes an openable and closable front cover 11 and a rear cover 12, a supply tray 13, an output tray 15, and a conveyance path 17. The supply tray 13 is detachably mounted at a lower part of the main housing 2 and holds sheet S, which is a standardized printing sheet such as A4 size paper. The sheet S may be plain paper, thick paper, or other recording media, including OHP films. The output tray 15 is positioned at an upper part of the main housing 2 and receives the sheet S after image formation.

The conveyance unit 3 includes a pickup roller 21, a separation roller 22, a registration roller 24, and multiple conveyance rollers 23. The pickup roller 21 picks up a sheet S from the supply tray 13 and conveys the sheet S toward the conveyance path 17. The separation roller 22 separates the sheets S picked up by the pickup roller 21, feeding the sheets one by one to the registration roller 24. The registration roller 24 corrects skewing of the sheet S and then conveys the sheet S to the process unit 4, specifically onto an endless belt 63 (described later). The conveyance rollers 23 convey the sheet S along the conveyance path 17 after passing through the fixing unit 5, eventually discharging the sheet S onto the output tray 15. The conveyance unit 3 rotates each roller based on the drive of a main motor (not shown) arranged within the main housing 2.

The conveyance unit 3 also includes multiple switchback rollers 25 and a reverse conveyance path 27, which are configured to reverse the sheet S after single-sided printing. The printer 10 is capable of switching the conveyance destination of the sheet S between the output tray 15 and the reverse conveyance path 27, indicated by a dashed line, by oscillating a flapper 28 positioned downstream of the fixing unit 5 along the conveyance path 17. The conveyance unit 3 moves the flapper 28 to the position indicated by a two-dot chain line and rotates the switchback rollers 25, thereby guiding the sheet S upward along the reverse conveyance path 27. After moving the sheet S upward, the conveyance unit 3 rotates the switchback rollers 25 in the reverse direction, conveying the sheet S in the opposite direction along the reverse conveyance path 27. The sheet is conveyed forward, passing below the supply tray 13, and reaches the front side of the printer. As a result, the sheet S is reversed and conveyed back to the base end of the conveyance path 17. The printer 10 performs duplex printing by executing printing on the upper surface of the reversed sheet S, which is the opposite side of the initially printed surface. Additionally, the printer 10 is capable of printing even when the rear cover 12 is left open, and after printing, the sheet S can be discharged onto the opened rear cover 12.

The process unit 4 has a function of forming toner images of different colors on a sheet S and transfers the toner images onto the sheet S. The process unit 4 includes a laser unit 30, an image forming unit 31, and a transfer unit 34.

The image forming unit 31 includes a drum unit 32 and four developing cartridges 33Y, 33M, 33C, and 33K.

The laser unit 30 is positioned in the upper part of main housing 2 and includes a semiconductor laser, an LD driver configured to drive the semiconductor laser, and a polygon mirror, among other components. The laser unit 30 emits a laser beam, indicated by a one-dot chain line, onto the surface of a photoconductor drum 41 of the drum unit 32, thereby exposing the surface of the photoconductor drum 41.

The drum unit 32 is positioned within the main housing 2 between the supply tray 13 and the laser unit 30. The drum unit 32 includes four photoconductor drums 41, four chargers 43, and a support frame 45 that supports the photoconductor drums 41 and other components. The drum unit 32 is detachable from the main housing 2 when the front cover 11 is open. Since the four photoconductor drums 41 and the four chargers 43 are arranged in the same positional relationship, only one charger 43 is labeled in FIG. 1 to avoid making the drawing overly complex.

The developing cartridges 33Y, 33M, 33C, and 33K correspond to four colors: yellow (Y), magenta (M), cyan (C), and black (K). These cartridges are detachably mounted on the drum unit 32 in this order from the front to the rear of printer 10. Each of the developing cartridges 33Y, 33M, 33C, and 33K includes a developing roller 51, a supply roller 52, and a toner storage unit 53. Although the four developing cartridges 33Y, 33M, 33C, and 33K contain different toner colors, their other components are identical. Therefore, in the following description, the four developing cartridges corresponding to each color are collectively referred to as a developing cartridge 33. Since the positional relationships of the developing rollers 51, the supply rollers 52, and the toner storage units 53 in the four developing cartridges 33Y, 33M, 33C, and 33K are the same, only one developing roller 51, one supply roller 52, and one toner storage unit 53 are labeled in FIG. 1 to avoid making the drawing overly complex.

The transfer unit 34 is positioned within the main housing 2 between the supply tray 13 and the drum unit 32. The transfer unit 34 includes a drive roller 61, a driven roller 62, an endless belt 63, and four transfer rollers 64. The endless belt 63 is wound around the drive roller 61, which is located below the rear end of the drum unit 32, and the driven roller 62, which is located below the front end of the drum unit 32. The endless belt 63 is made of a resin material such as polycarbonate and has a mirror-finished surface. The upper surface of the endless belt 63 extends substantially horizontally beneath the image forming unit 31, comes into contact with the photoconductor drums 41, and serves as a sheet conveyance surface 63A, which conveys the sheet S while being in contact with the back side of the sheet S.

The four transfer rollers 64 are positioned inside the endless belt 63 in such a way that the endless belt 63 is sandwiched between each of the transfer rollers 64 and the corresponding photoconductor drum 41. Each transfer roller 64 is installed in contact with the inner surface of the endless belt 63 from the back side of the sheet conveyance surface 63A. The endless belt 63 is negatively charged when a negative transfer bias is applied to each transfer roller 64, and the electrostatic force holds the sheet S on the sheet conveyance surface 63A while conveying the sheet S along the conveyance path 17.

The charger 43 is positioned above the photoconductor drum 41 and is, for example, a scorotron-type charger equipped with a charging wire and a grid. The image forming unit 31 generates corona discharge using the charger 43 based on the power supplied from a high-voltage power board 47 (see FIG. 2), thereby uniformly applying positive charging to the surface of the photoconductor drum 41. The laser unit 30 irradiates a laser beam onto the surface of the photoconductor drum 41, exposing the surface and forming an electrostatic latent image based on image data. The device for charging the photoconductor drum 41 is not limited to a scorotron-type charger and may instead be another type of charging device, such as a roller-type charging roller. Additionally, the polarity used to charge the photoconductor drum 41 is not limited to positive charging and may instead be negative charging.

The process unit 4 supplies toner from the toner storage unit 53 to the supply roller 52, which then delivers the toner to the developing roller 51. The toner supplied to the developing roller 51 is carried on the surface of the developing roller 51 as it rotates. The developing roller 51 rotates by receiving rotational drive power transmitted from the main motor and supplies toner to the photoconductor drum 41, thereby developing the electrostatic latent image formed on the surface of the photoconductor drum 41 and forming a toner image.

The toner carried on the developing roller 51 is transferred onto the electrostatic latent image on the photoconductor drum 41 due to the potential difference between the developing roller 51 and the electrostatic latent image on the photoconductor drum 41, thereby forming the toner image. This toner image is transferred onto the sheet S by applying a negative transfer bias to the transfer roller 64 while bringing the photoconductor drum 41 into contact with the sheet S on the endless belt 63. The sheet S sequentially receives toner images of multiple colors transferred from the four photoconductor drums 41 and is then conveyed to the fixing unit 5.

The fixing unit 5 is positioned within the main housing 2, located behind the process unit 4. The fixing unit 5 includes a heating roller 67 that heats the sheet S and a pressing unit 68 that sandwiches the sheet S between the heating roller 67 and itself. The heating roller 67 contains a heater 69 inside, which heats the heating roller 67. The pressing unit 68 includes an endless belt, a pressure pad that presses the endless belt against the heating roller 67, a holder that supports the pressure pad, and a belt guide. The pressing unit 68 rotates by receiving rotational drive power transmitted from the main motor and presses the sheet S against the heating roller 67, applying pressure to the sheet S. As a result, the fixing unit 5 fixes the toner image onto the sheet S. Additionally, a cleaning device 8 is arranged below the endless belt 63 to collect toner (that forms marks described later), paper dust, and other residues adhering to the surface of the endless belt 63.

The main board 6 is a control board that centrally manages the printer 10. As illustrated in FIG. 2, the main board 6 includes an ASIC 71, a ROM 72, a RAM 73, and an NVRAM 74. The ASIC 71 (Application Specific Integrated Circuit) incorporates a CPU and other components. The ASIC 71 is an example of a controller (having hardware) according to aspects of the present disclosure. The controller in the present disclosure is not limited to an ASIC and may instead be another type of device, such as an SoC (System on a Chip).

The ROM 72 stores various control programs and configuration information for controlling the printer 10. These control programs include a program for executing a color misalignment correction control process illustrated in FIG. 4, which will be described later. The RAM 73 is, for example, a DRAM and is used as a working area for reading various control programs and as a storage area for temporarily storing image data based on print jobs. The NVRAM 74 is used to store configuration values (such as flag values) used in various processes. For example, the NVRAM 74 stores a first threshold level TH1, a second threshold level TH2, a third threshold level TH3, a determination value, a search width W, and other related values, which will be described later. The ASIC 71 executes processing based on the control programs read from the ROM 72 and signals input from various sensors, such as a phototransistor PTr on the sensor board 7, which will be described later. The ASIC 71 stores processing results in the RAM 73 and the NVRAM 74 while controlling various components of the printer 10 to perform image formation and color misalignment correction processing.

The configuration of the main board 6 shown in FIG. 2 is merely an example. For instance, the main board 6 may include a non-volatile storage device such as an HDD or an SSD. Additionally, the control program for executing the color misalignment correction control process may be stored in the NVRAM 74. The first threshold level TH1, determination values, and other parameters may also be stored in the ROM 72. The main board 6 may be configured without the NVRAM 74. Furthermore, the storage medium for storing the control program, the first threshold level TH1, and other related data may be an external storage medium such as a USB memory device, or a storage media such as a CD-ROM or a DVD-ROM.

Next, a mechanism for detecting a mark (which is a toner image) formed on the surface of the endless belt 63 (sheet conveyance surface 63A) will be described. As illustrated in FIG. 1, the sensor board 7 is positioned behind and below the endless belt 63 (i.e., the drive roller 61). The sensor board 7 is assembled into the main housing 2.

Figure 3:
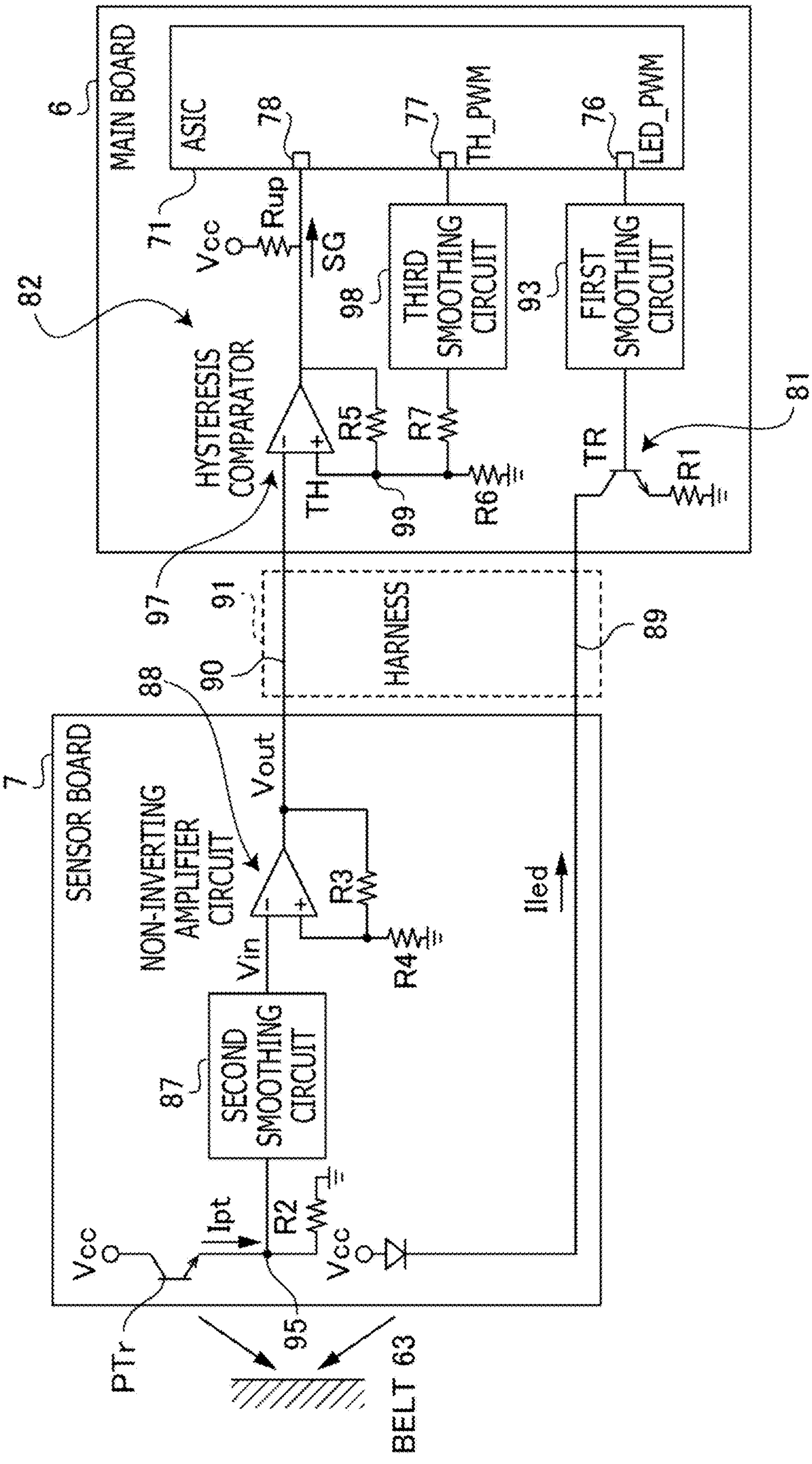
FIG. 3 is a circuit diagram illustrating a main board and a sensor board.

FIG. 3 is a circuit diagram illustrating the main board 6 and the sensor board 7. As shown in FIG. 3, the main board 6 includes a light emission amount adjustment circuit 81 and a comparator circuit 82. The sensor board 7 includes a light-emitting diode LED, a phototransistor PTr, a second smoothing circuit 87, and a non-inverting amplifier circuit 88. The main board 6 and the sensor board 7 are connected to each other via a harness 91, which includes multiple wires such as wiring 89 and wiring 90.

The light emission amount adjustment circuit 81 is a circuit that adjusts the light emission amount of the light-emitting diode LED in response to the input of a control signal LED_PWM. The light emission amount adjustment circuit 81 includes a first smoothing circuit 93, a transistor TR, and a resistor R1. The transistor TR is, for example, an NPN transistor.

The control signal LED_PWM is a pulse width modulation (PWM) signal in which switching between on and off states occurs at a particular frequency. When the control signal LED_PWM is on, the ASIC 71 applies a particular voltage to the first smoothing circuit 93. When the control signal LED_PWM is off, the ASIC 71 does not apply voltage to the first smoothing circuit 93.

A terminal 76 of the ASIC 71 is connected to the base of the transistor TR via the first smoothing circuit 93. The first smoothing circuit 93 includes a resistor and a capacitor and smooths the voltage of the control signal LED_PWM input from the terminal 76. The smoothed voltage is then output to the base of the transistor TR. Accordingly, the ASIC 71 can adjust the output voltage of the first smoothing circuit 93 by changing the value of the control signal LED_PWM (hereinafter referred to as the PWM value). This allows the ASIC 71 to adjust the current flowing from the collector to the emitter of the transistor TR.

The PWM value represents the duty ratio of the pulse width modulation (PWM) signal. The duty ratio refers to the proportion of time within one cycle of the PWM signal during which the signal is in the on state.

The ASIC 71 can gradually adjust the duty ratio of the control signal LED_PWM using a 10-bit PWM value. Specifically, a PWM value of 0, which is the minimum 10-bit value, indicates a duty ratio of 0%. Conversely, a PWM value of 210-1 (i.e., 1023), which is the maximum 10-bit value, indicates a duty ratio of 100%. The ASIC 71 incrementally changes the duty ratio of the control signal LED_PWM according to the bit value of the PWM value, ranging from 0 to 1023.

The emitter of the transistor TR is connected to the ground via the resistor R1. The collector of the transistor TR is connected to the light-emitting diode LED via the wiring 89 included in the harness 91. The anode of the light-emitting diode LED is connected to the power supply unit Vcc, while the cathode is connected to the collector of the transistor TR. The LED is an example of the light-emitting unit according to aspects of the present disclosure. The light-emitting unit in the present disclosure is not limited to a light-emitting diode LED and may instead be a laser diode, a halogen lamp, an organic EL, or another suitable light-emitting element.

The transistor TR allows current to flow between the collector and the emitter thereof when a voltage is output to the base from the first smoothing circuit 93, causing current to flow between the base and the emitter. A current Iled flows through a path from the power supply unit Vcc, passing through the light-emitting diode LED, the transistor TR, and the resistor R1, to the ground, thereby causing the light-emitting diode LED to emit light.

The ASIC 71 adjusts the light emission amount of the LED by modifying the PWM value of the control signal LED_PWM, which consequently changes the current value of Iled. Increasing the PWM value of the control signal LED_PWM causes the ASIC 71 to increase the current value of Iled, thereby increasing the light emission amount of the light-emitting diode LED. Conversely, decreasing the PWM value reduces the current value of Iled, thereby decreasing the light emission amount of the light-emitting diode LED. The configuration of the light emission amount adjustment circuit 81 described above is merely an example. For instance, the transistor TR may be a PNP transistor instead.

The light-emitting diode LED is positioned to face the endless belt 63 and emits light toward the outer peripheral surface of the endless belt 63. The phototransistor PTr is positioned to receive the light emitted from the light-emitting diode LED and reflected by the endless belt 63.

Accordingly, when the PWM value of the control signal LED_PWM is adjusted, the light emission amount of the light-emitting diode LED changes, thereby adjusting the amount of light received by the phototransistor PTr.

The collector of the phototransistor PTr is connected to the power supply unit Vcc, and the emitter is connected to the ground via the resistor R2. When the phototransistor PTr receives light reflected from the endless belt 63, a photocurrent Ipt is generated between the collector and the emitter in proportion to the received light amount. The photocurrent Ipt flows through a path from the power supply unit Vcc, passing through the phototransistor PTr and the resistor R2, to the ground.

The phototransistor PTr is an example of the light-receiving unit according to aspects of the present disclosure. The light-receiving unit in the present disclosure is not limited to the phototransistor PTr and may instead be another type of light-receiving element capable of converting light into an electrical signal, such as a photodiode or a CMOS image sensor.

The input terminal of the second smoothing circuit 87 is connected to a connection point 95 between the phototransistor PTr and the resistor R2, where a voltage corresponding to the magnitude of the photocurrent Ipt, that is, a voltage corresponding to the amount of received light, is input. The output terminal of the second smoothing circuit 87 is connected to the non-inverting input terminal of the non-inverting amplifier circuit 88. The second smoothing circuit 87 smooths the voltage input from the connection point 95 and outputs the smoothed voltage as an input voltage Vin to the non-inverting input terminal of the non-inverting amplifier circuit 88. The output terminal of the non-inverting amplifier circuit 88 is connected to the inverting input terminal via the resistor R3. Additionally, the output terminal of the non-inverting amplifier circuit 88 is connected to the ground via the resistors R3 and R4. The non-inverting amplifier circuit 88 amplifies the input voltage Vin at a gain determined by the resistance values of the resistors R3 and R4 and outputs the amplified signal as a light reception signal Vout from the output terminal. The sensor board 7 outputs a light reception signal Vout with a higher voltage as the amount of light received by the phototransistor PTr increases.

The comparator circuit 82 includes a comparator 97, a third smoothing circuit 98, and a pull-up resistor Rup. The output terminal of the non-inverting amplifier circuit 88 is connected to the inverting input terminal of the comparator 97 via the wiring 90 included in the harness 91. The comparator 97 is a hysteresis comparator, with its output terminal connected to the non-inverting input terminal via the resistor R5. By modifying the threshold level according to the output state, the comparator 97 reduces the influence of noise. Additionally, the output terminal of the comparator 97 is connected to the power supply unit Vcc via the pull-up resistor Rup and is also connected to terminal 78 of the ASIC 71. Furthermore, the output terminal is connected to the ground via the resistors R5 and R6. The resistor R5 serves as a feedback resistor for the hysteresis comparator 97.

The input terminal of the third smoothing circuit 98 is connected to terminal 77 of the ASIC 71, where a threshold signal TH_PWM, which is a pulse width modulation (PWM) signal, is input from terminal 77. The output terminal of the third smoothing circuit 98 is connected to the non-inverting input terminal of the comparator 97 via a resistor R7. The third smoothing circuit 98 smooths the voltage of the threshold signal TH_PWM. The voltage smoothed by the third smoothing circuit 98 is divided at a connection point 99 by the resistors R6 and R7. The voltage divided by the resistors R6 and R7 is input to the non-inverting input terminal of the comparator 97 as a threshold voltage TH. The comparator 97 compares the light reception signal Vout input to the inverting input terminal with the threshold voltage TH input to the non-inverting input terminal and outputs the comparison result as a comparison result signal SG to terminal 78 of the ASIC 71.

The comparator circuit 82 compares the voltage value of the light reception signal Vout, which corresponds to the amount of light received by the phototransistor PTr (hereinafter sometimes referred to as the light reception signal level), with the voltage value of the threshold voltage TH (hereinafter sometimes referred to as the threshold level). If the light reception signal level exceeds the threshold level, the comparator circuit 82 outputs a Low-level comparison result signal SG. In this case, the ASIC 71 receives the Low-level comparison result signal SG at terminal 78. If the light reception signal level does not exceed the threshold level, the comparator circuit 82 outputs a high-impedance signal. In this case, the ASIC 71 receives a High-level comparison result signal SG at terminal 78 due to the pull-up resistor Rup.

The threshold level is adjustable under the control of the ASIC 71. Specifically, the ASIC 71 outputs a pulse width modulation (PWM) signal as the threshold signal TH_PWM, and the voltage of the output threshold signal TH_PWM is smoothed by the third smoothing circuit 98. For example, by changing the PWM value of the threshold signal TH_PWM, the ASIC 71 can adjust the threshold level to the first threshold level TH1, the second threshold level TH2, or the third threshold level TH3, which will be described later.

Color Misalignment Correction Control Process

Figure 4:
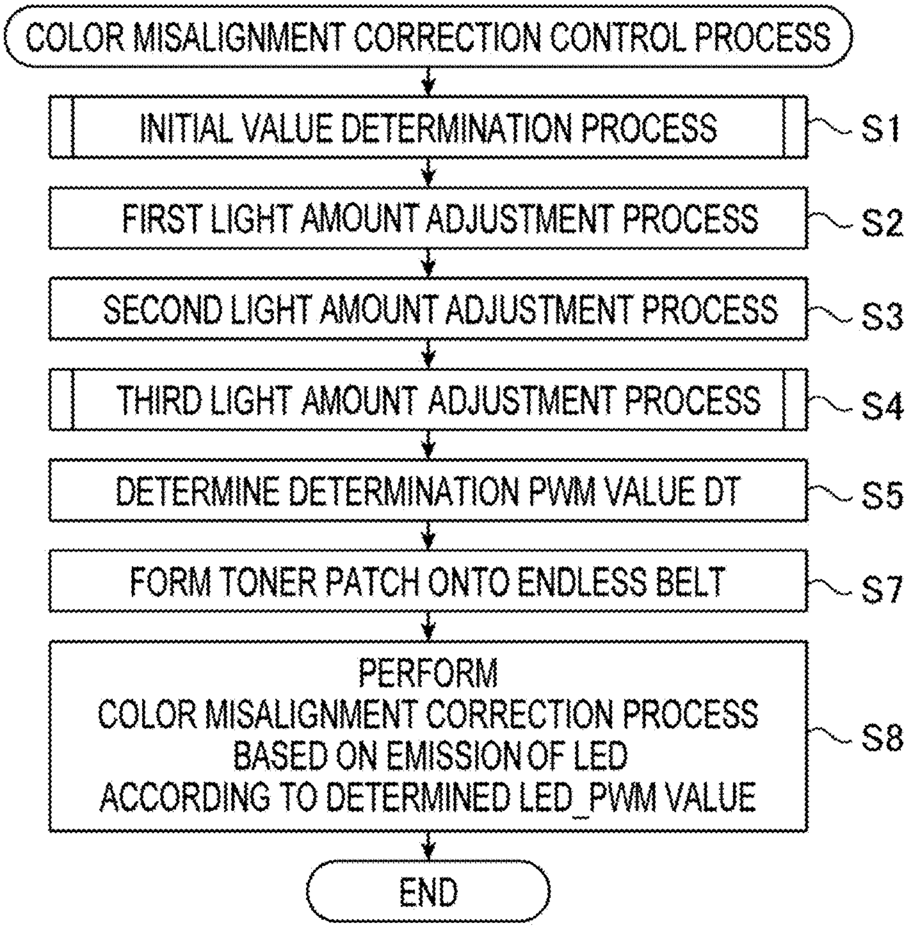
FIG. 4 is a flowchart illustrating a color misalignment correction control process.

Next, the color misalignment correction control process executed by the ASIC 71 will be described. FIG. 4 illustrates a flowchart of the color misalignment correction control process. By executing the process shown in FIG. 4, the ASIC 71 corrects misalignment of transfer positions (color misalignment) where respective photoconductor drums 41 transfer toner images onto the sheet S.

The ASIC 71 starts the process shown in FIG. 4 when, for example, the power of the printer 10 is turned on. However, the condition for initiating the process shown in FIG. 4 is not limited to the power-on condition of the printer 10. The ASIC 71 may also execute the process when other conditions are met. For instance, the process may be executed when the drum unit 32 is replaced, when a particular number of sheets S have been printed since the last execution of the color misalignment correction control process, or when the ambient temperature of the printer 10 changes beyond a threshold level.

The ASIC 71 determines a determination PWM value DT in S5 based on the threshold levels determined through the light amount adjustment processes in S2, S3, and S4 of FIG. 4. The ASIC 71 then outputs a control signal LED_PWM corresponding to the determined determination PWM value DT to the light emission amount adjustment circuit 81, causing the light-emitting diode LED to emit light, and executes color misalignment correction in S8.

In conventional image forming apparatuses, the light amount adjustment process determines the determination PWM value DT by sequentially increasing the PWM value from an initial value corresponding to a low light reception signal level in particular search increments until the light reception signal level reaches the threshold level. The PWM value at the point where the light reception signal level reaches the threshold level is then determined as the threshold level. However, in such a light amount adjustment process, if the endless belt 63 deteriorates and its glossiness decreases, the difference between the initial value and the determined threshold level increases. As a result, the processing time required to determine the threshold level from the initial value becomes longer. To address this issue, in the present embodiment, the ASIC 71 dynamically adjusts the initial value IV and the search width Win S1 according to the deterioration state of the endless belt 63. The ASIC 71 then executes the subsequent light amount adjustment processes from S2 onward, thereby reducing the processing time required to determine the threshold level, such as the first adjustment value AV1, which will be described later.

Figure 5:
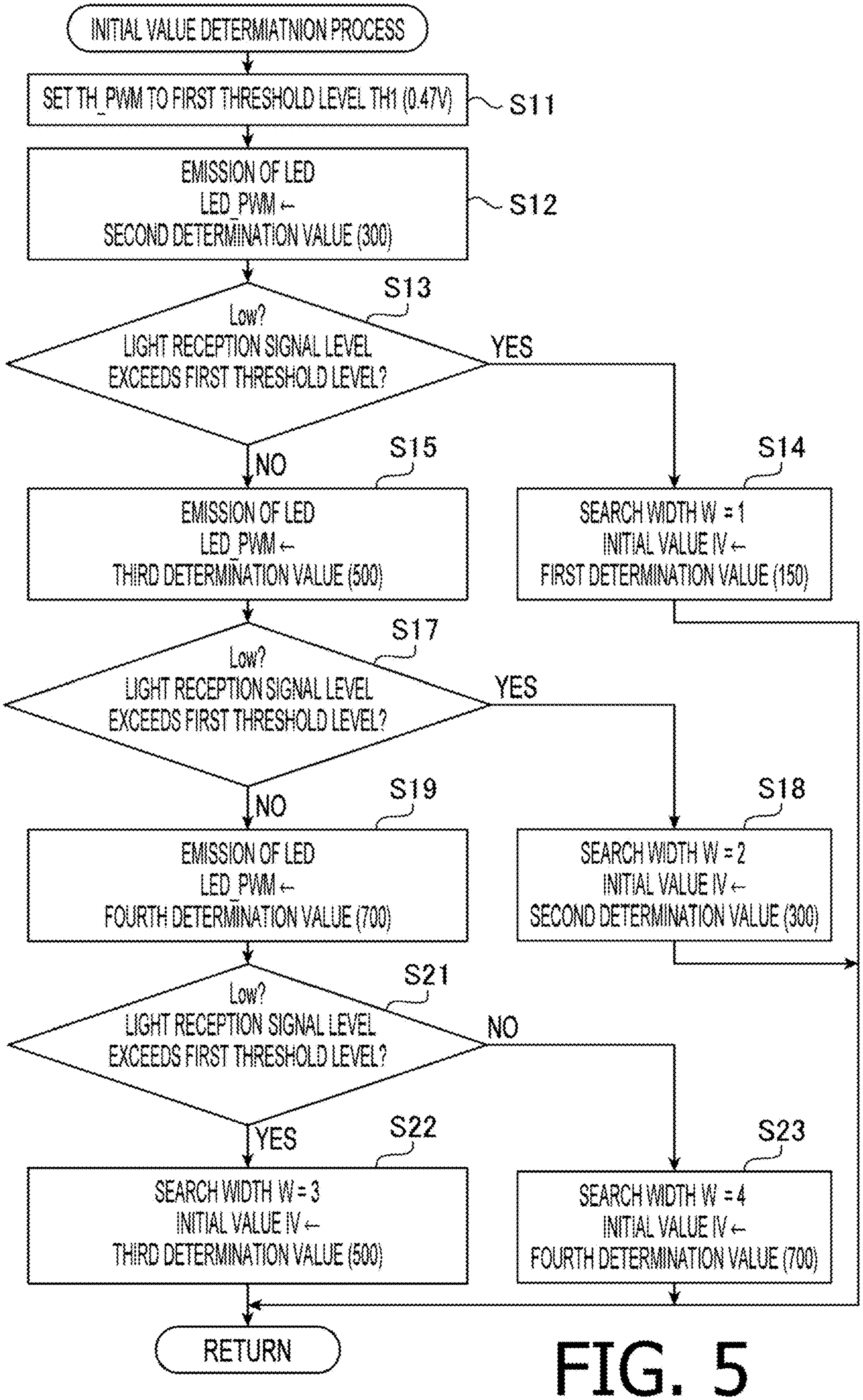
FIG. 5 is a flowchart illustrating an initial value determination process.

Specifically, in S1, the ASIC 71 executes the initial value determination process illustrated in FIG. 5. As shown in FIG. 5, in S11, the ASIC 71 sets the PWM value of the threshold signal TH_PWM to the first threshold level TH1. The first threshold level TH1 is, for example, 0.47 V. The ASIC 71 adjusts the PWM value of the threshold signal TH_PWM so that the threshold voltage TH is set to the magnitude corresponding to the first threshold level TH1.

Next, in S12, the ASIC 71 drives the sensor board 7 to activate the light-emitting diode LED. The ASIC 71 also sets the PWM value of the control signal LED_PWM to the second determination value JV2. The NVRAM 74 stores multiple different determination values used to determine the initial value IV and the search width W. For example, in the present embodiment, four determination values, i.e., a first determination value JV1, a second determination value JV2, a third determination value JV3, and a fourth determination value JV4, are stored. Additionally, the NVRAM 74 stores the search width W corresponding to the magnitude of each determination value. The storage location of the determination values and the search width W is not limited to the NVRAM 74 and may instead be the ROM 72 or another storage medium.

Each determination value represents the PWM value (adjustment value) of the control signal LED_PWM. For example, the first determination value JV1, the second determination value JV2, the third determination value JV3, and the fourth determination value JV4 are assigned PWM values of 150, 300, 500, and 700, respectively, in this order. Additionally, the search width W corresponding to each of the first to fourth determination values JV1 to JV4 is set to 1, 2, 3, and 4, respectively. Accordingly, the four search widths W are set to increase by 1 in proportion to the magnitude of the first to fourth determination values JV1 to JV4. The values and numbers of the determination values and search widths W described above are merely examples.

The ASIC 71 sequentially outputs the control signal LED_PWM corresponding to each determination value to the light emission amount adjustment circuit 81, starting from the smallest determination value. When the ASIC 71 receives a Low-level comparison result signal SG from the comparator circuit 82, the ASIC 71 determines the initial value IV and the search width W based on the corresponding determination value. Specifically, in S12, the ASIC 71 outputs the control signal LED_PWM with a PWM value of 300, which corresponds to the second determination value JV2. Then, in S13, the ASIC 71 determines whether the light reception signal level has exceeded the first threshold level TH1 (0.47 V).

The comparator circuit 82 outputs a Low-level comparison result signal SG when the light reception signal level exceeds the threshold level. That is, if the light reception signal level, when the light-emitting diode LED is activated using the control signal LED_PWM corresponding to the second determination value JV2, exceeds the first threshold level TH1, the comparator circuit 82 outputs a Low-level comparison result signal SG. When the ASIC 71 receives a Low-level comparison result signal SG at terminal 78 (S13: YES), the ASCIC 71 proceeds to execute S14.

In S14, the ASIC 71 determines the first determination value JV1 as the initial value IV. Accordingly, when the ASIC 71 receives a comparison result signal SG indicating that the light reception signal level has exceeded the threshold level, the ASIC 71 selects an initial value IV that is smaller than the corresponding determination value (hereinafter sometimes referred to as the relevant determination value), which in this case is the second determination value JV2. Among the four determination values, the ASIC 71 selects the determination value that is immediately before and smaller than the relevant determination value, which in this case is the first determination value JV1 (150), as the initial value IV. Additionally, the ASIC 71 determines the search width W as the value corresponding to the first determination value JV1, which is 1. The ASIC 71 stores the determined initial value IV and search width W in, for example, the RAM 73. After executing S14, the ASIC 71 terminates the process shown in FIG. 5. The relevant determination value is an example of a particular determination value in the present disclosure.

On the other hand, in S13, if the light reception signal level, when the light-emitting diode LED is activated using the control signal LED_PWM with the PWM value of the second determination value JV2, does not exceed the first threshold level TH1, the comparator circuit 82 outputs a High-level comparison result signal SG to the terminal 78. When the ASIC 71 receives the High-level comparison result signal SG, it makes a negative determination in S13 (S13: NO) and proceeds to execute S15.

Since the process in S15 and subsequent steps is similar to the previously described processes in S12, S13, and S14, their explanations are omitted as appropriate. In S15, the ASIC 71 sets the PWM value of the control signal LED_PWM to the third determination value JV3 (500) and activates the light-emitting diode LED. Next, if the light reception signal level, when the LED is activated using the control signal LED_PWM corresponding to the third determination value JV3, exceeds the first threshold level TH1 (S17: YES), the ASIC 71 determines the second determination value JV2 (300), which is the determination value immediately before the relevant determination value (in this case, the third determination value JV3) as the initial value IV (S18). Additionally, in S18, the ASIC 71 determines the search width W as the value corresponding to the second determination value JV2, which is 2, and then terminates the process shown in FIG. 5.

In S17, if the ASIC 71 determines that the light reception signal level does not exceed the first threshold level TH1 and receives a High-level comparison result signal SG (S17: NO), the ASIC 71 sets the PWM value of the control signal LED_PWM to the fourth determination value JV4 (700) and activates the light-emitting diode LED (S19).

Next, if the light reception signal level, when the LED is activated using the control signal LED_PWM corresponding to the fourth determination value JV4, exceeds the first threshold level TH1 (S21: YES), the ASIC 71 determines the third determination value JV3 (500), which is the determination value immediately before the relevant determination value (in this case, the fourth determination value JV4) as the initial value IV (S22). Additionally, in S22, the ASIC 71 determines the search width W as the value corresponding to the third determination value JV3, which is 3, and then terminates the process shown in FIG. 5. If, in S21, the ASIC 71 determines that the light reception signal level does not exceed the first threshold level TH1 (S21: NO), it determines the fourth determination value JV4 (700) as the initial value IV and sets the corresponding value (4) as the search width W (S23), then terminates the process shown in FIG. 5.

Returning to FIG. 4, after executing S1, the ASIC 71 executes the first light amount adjustment process (S2). In the first light amount adjustment process, the ASIC 71 determines the first adjustment value AV1 using the initial value IV and the search width W determined in S1. In S2, the ASIC 71 sequentially outputs the control signal LED_PWM with PWM values updated in increments of the search width W from the initial value IV determined in S1 to the light emission amount adjustment circuit 81. The PWM value of the control signal LED_PWM at which the light reception signal level exceeds the first threshold level TH1 is determined as the first adjustment value AV1. Specifically, the ASIC 71 first sets the PWM value of the threshold signal TH_PWM so that the threshold level is set to the first threshold level TH1 (0.47 V), similar to S11 in FIG. 5. Next, the ASIC 71 outputs the control signal LED_PWM with the PWM value corresponding to the initial value IV determined in S1, activating the light-emitting diode LED.

Next, the ASIC 71 determines whether the light reception signal level exceeds the first threshold level TH1. If the light reception signal level does not exceed the first threshold level TH1, the ASIC 71 increases the PWM value of the control signal LED_PWM by the search width W determined in S1 and again determines whether the light reception signal level exceeds the first threshold level TH1. The ASIC 71 continues increasing the PWM value of the control signal LED_PWM in increments of the search width W until the light reception signal level exceeds the first threshold level TH1. When the ASIC 71 determines that the light reception signal level has exceeded the first threshold level TH1, the ASIC 71 sets the PWM value of the control signal LED_PWM at that point as the first adjustment value AV1.

Figure 6:
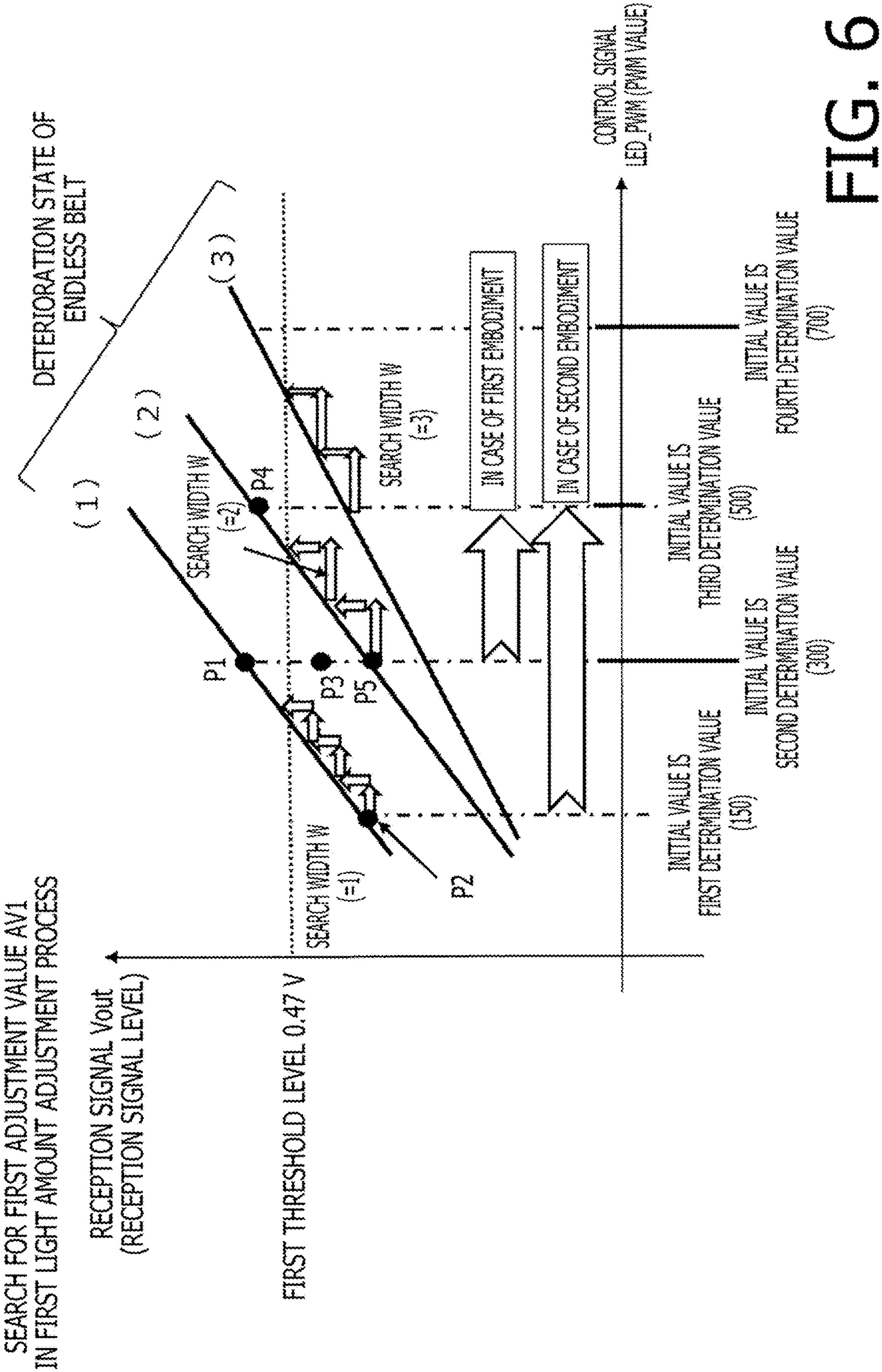
FIG. 6 is a diagram illustrating a state of a first adjustment value search process in a first light amount adjustment process.

Lines (1) to (3) of FIG. 6 represent cases where the deterioration state of the endless belt 63 varies, with (1) to (3) indicating a progressive deterioration of the endless belt 63. As the deterioration progresses from Line (1) to Line (3), the glossiness of the endless belt 63 decreases. Consequently, when the light-emitting diode LED is activated with the same PWM value, the amount of light received by the phototransistor PTr decreases in the order of Line (1) to Line (3). As a result, the first adjustment value AV1 increases as the deterioration of the endless belt 63 progresses. For example, if the first determination value JV1 is set as the initial value IV and the search width W is set to 1 under the deterioration state indicated by Line (3), the processing time required to determine the first adjustment value AV1 becomes longer. To address this, in the initial value determination process, the ASIC 71 uses the first threshold level TH1 and the four determination values to pre-adjust the initial value IV and the search width W before executing the first light amount adjustment process.

The ASIC 71 starts the determination of the comparison result signal SG from the second determination value JV2 in the initial value determination process (S13 in FIG. 5) and increases or decreases the determination value based on whether the light reception signal level exceeds the first threshold level TH1. For example, as shown at Point P1 in FIG. 6, if the light reception signal level exceeds the first threshold level TH1 at JV2 (300) in S13, the ASIC 71 sets the determination value at that time (specifically, the first determination value JV1 (150), which is one step smaller than JV2) as the initial value IV (S14). In this case, in the first light amount adjustment process, the ASIC 71 starts from Point P2, where the first determination value JV1 is set as the initial value IV, and increases the PWM value of the control signal LED_PWM in increments of the search width W (1) corresponding to the first determination value JV1 to search for the first adjustment value AV1.

On the other hand, as shown at Point P3 in FIG. 6, if the light reception signal level does not exceed the first threshold level TH1 in S13, the ASIC 71 sets the PWM value of the control signal LED_PWM to the third determination value JV3 and executes the determination in S17. Then, as shown at Point P4, if the light reception signal level exceeds the first threshold level TH1 at the second determination value JV2 (500) in S17 (S17: YES), the ASIC 71 starts from Point P5, where the second determination value JV2, which is one step smaller than the third determination value JV3, is set as the initial value IV. From there, the ASIC 71 increases the PWM value of the control signal LED_PWM in increments of the search width W (2) corresponding to the second determination value JV2 to search for the first adjustment value AV1.

Similarly, the initial value IV and the search width W are adjusted based on the determination result in S21. This adjustment allows the ASIC 71 to set an initial value IV that is smaller than the increasing first adjustment value AV1 as the deterioration of the endless belt 63 progresses while keeping it as close as possible to AV1. Additionally, by increasing the search width W as the initial value IV increases, the ASIC 71 reduces the processing time required to increment the PWM value of the control signal LED_PWM from the initial value IV to the first adjustment value AV1.

As shown in FIG. 4, after executing S2, the ASIC 71 executes the second light amount adjustment process in S3. In the second light amount adjustment process, the ASIC 71 determines the second adjustment value AV2 using the first adjustment value AV1 determined in S2 and the search width W determined in S1. Additionally, in the second light amount adjustment process, the ASIC 71 uses a second threshold level TH2, which is higher than the first threshold level TH1. For example, the second threshold level TH2 may be 1.62 V.

In S3, the ASIC 71 sequentially outputs the control signal LED_PWM with PWM values updated in increments of the search width W from the first adjustment value AV1 determined in S2 to the light emission amount adjustment circuit 81. The PWM value of the control signal LED_PWM at which the light reception signal level exceeds the second threshold level TH2 is determined as the second adjustment value AV2. Specifically, the ASIC 71 first sets the PWM value of the threshold signal TH_PWM so that the threshold level is set to the second threshold level TH2 (1.62 V), similar to S11 in FIG. 5. Next, the ASIC 71 outputs the control signal LED_PWM with the PWM value corresponding to the first adjustment value AV1 determined in S2, activating the light-emitting diode LED.

If the light reception signal level does not exceed the second threshold level TH2, the ASIC 71 increases the PWM value of the control signal LED_PWM by the search width W determined in S1. The ASIC 71 continues increasing the PWM value of the control signal LED_PWM in increments of the search width W until the light reception signal level exceeds the second threshold level TH2. When the ASIC 71 determines that the light reception signal level has exceeded the second threshold level TH2, the ASIC 71 sets the PWM value of the control signal LED_PWM at that point as the second adjustment value AV2.

After executing the second light amount adjustment process in S3, the ASIC 71 proceeds to execute the third light amount adjustment process in S4. In the third light amount adjustment process, the ASIC 71 determines the third adjustment value AV3 using the second adjustment value AV2 determined in S3 and the search width W determined in S1. In the third light amount adjustment process, the PWM value of the control signal LED_PWM at which the number of times the light reception signal level exceeds the third threshold level TH3 falls within a particular ratio of a particular sampling count is determined as the third adjustment value AV3. In the present embodiment, the particular sampling count is 120, and the particular ratio is between 30% and 70%. This process allows the ASIC 71 to determine the PWM value of the control signal LED_PWM (third adjustment value AV3) with high accuracy, ensuring that it closely matches the target third threshold level TH3.

Figure 7:
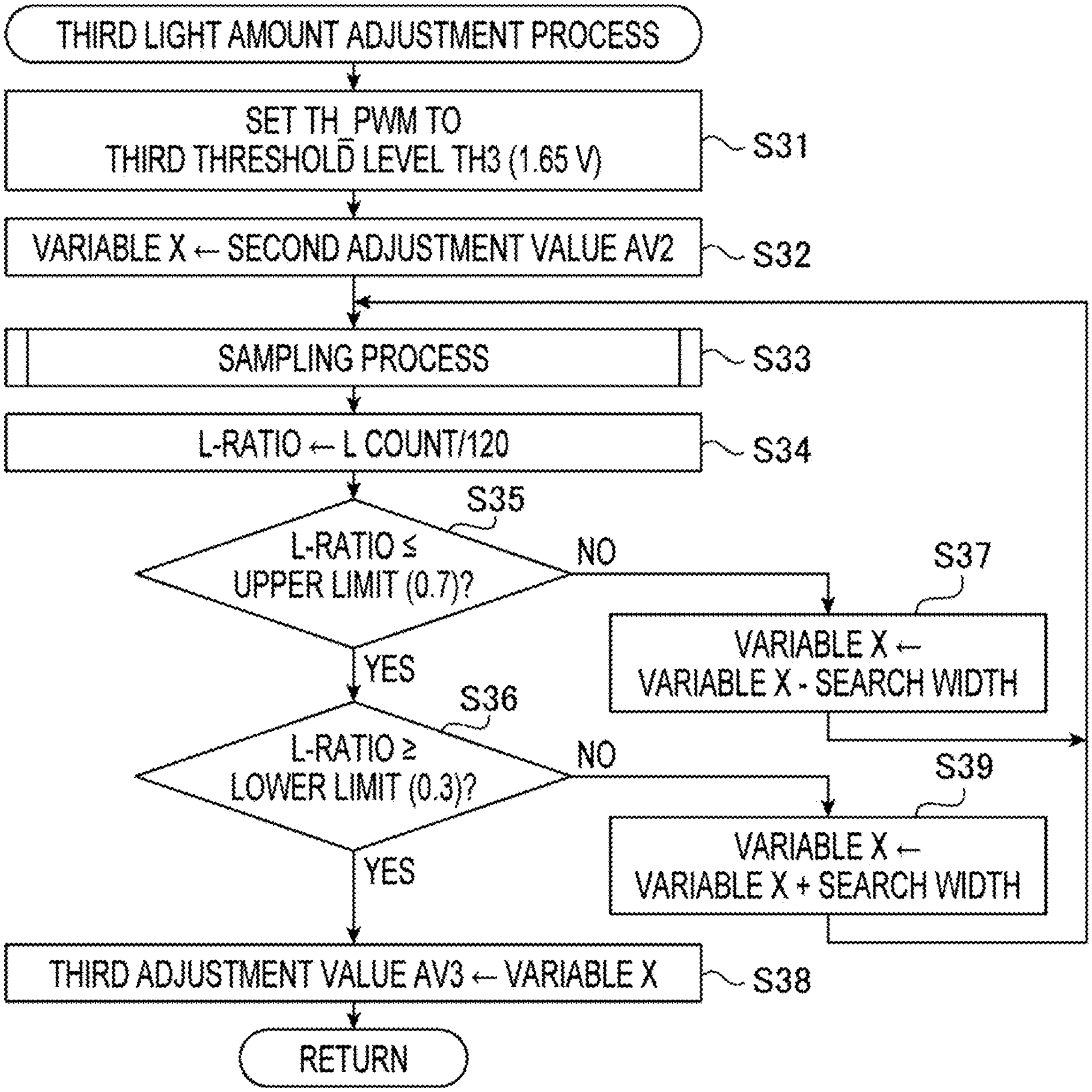
FIG. 7 is a flowchart illustrating a third light amount adjustment process.

As shown in FIG. 7, when the ASIC 71 starts the third light amount adjustment process, the ASIC 71 first sets the PWM value of the threshold signal TH_PWM so that the threshold level is set to the third threshold level TH3 (1.65 V), similar to S11 in FIG. 5 (S31). Although a value greater than the second threshold level TH2 is used as the third threshold level TH3, the same value as TH2 may also be used. Next, in S32, the ASIC 71 sets the second adjustment value AV2 as the initial value of the variable X. The variable X is the value that will ultimately be determined as the third adjustment value AV3.

Figure 8:
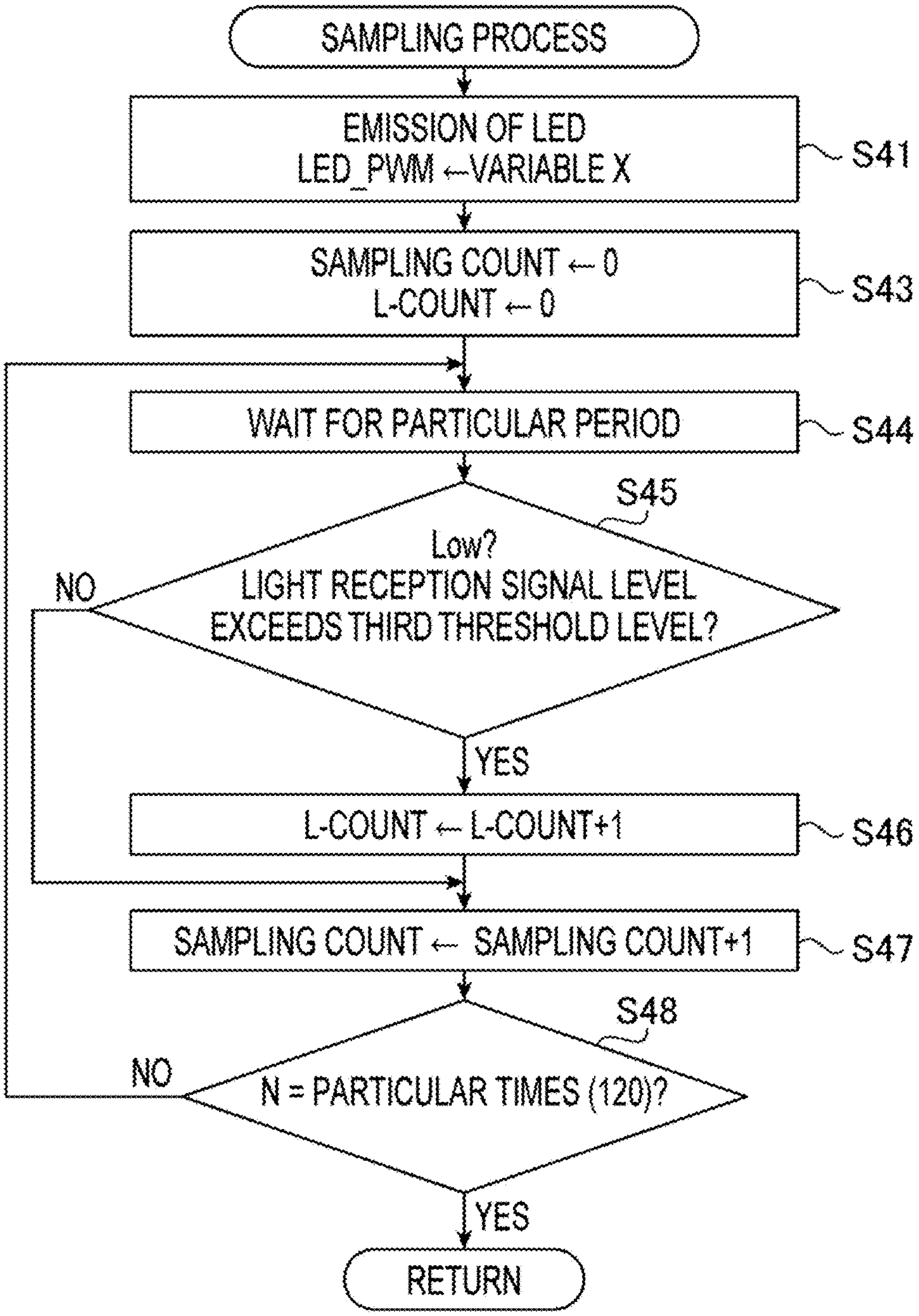
FIG. 8 is a flowchart illustrating a sampling process.

Next, the ASIC 71 executes the sampling process in S33. As shown in FIG. 8, when the ASIC 71 starts the sampling process, it first sets the PWM value of the control signal LED_PWM to the set value (which is the second adjustment value AV2 at this stage) and activates the light-emitting diode LED (S41). Then, in S43, the ASIC 71 initializes both the sampling count N and an L-count to 0. The sampling count N is a variable that tracks the number of comparisons between the light reception signal level and the third threshold level TH3 during the sampling process. In the present embodiment, the sampling count is set to 120, but this number is not limited to 120. The L-count is a variable that represents the number of times the light reception signal level exceeds the third threshold level TH3, as determined in S45, which will be described later.

Next, the ASIC 71 waits for a particular period (S44) and then determines whether the light reception signal level exceeds the third threshold level TH3 based on the comparison result signal SG (S45). If the light reception signal level exceeds the third threshold level TH3 (S45: YES), the ASIC 71 increments the L-count by 1 (S46) and also increments the sampling count N by 1 (S47). On the other hand, if the light reception signal level does not exceed the third threshold level TH3 (S45: NO), the ASIC 71 increments only the sampling count N by 1 (S47).

After executing S47, the ASIC 71 determines whether the sampling count N has reached 120 (S48). Until the sampling count increases to 120 (S48: NO), the ASIC 71 repeatedly executes the process from S44. Through this process, the ASIC 71 performs a comparison between the light reception signal level and the third threshold level TH3 at each particular waiting time, that is, at each particular sampling interval, and counts the number of times the light reception signal level exceeds the third threshold level TH3 as the L-count. The ASIC 71 executes this sampling process 120 times.

When the sampling count N reaches 120 (S48: YES), the ASIC 71 terminates the process shown in FIG. 8. As shown in FIG. 7, after executing the sampling process in S33, the ASIC 71 calculates the L-ratio by dividing the L-count recorded in S33 by 120 (the total sampling count) (S34). Then, the ASIC 71 determines whether the calculated L-ratio is equal to or below the upper limit (0.7) (S35). If the L-ratio is within the upper limit (S35: YES), the ASIC 71 proceeds to execute S36. If the L-ratio exceeds the upper limit (S35: NO), the ASIC 71 subtracts the search width W from the variable X (S37), effectively reducing the PWM value of the control signal LED_PWM by the search width W. The ASIC 71 then re-executes the sampling process in S33.

Additionally, in S36, the ASIC 71 determines whether the L-ratio is equal to or above the lower limit (0.3). If the L-ratio is equal to or above the lower limit (S36: YES), the ASIC 71 sets the current value of X as the third adjustment value AV3 (S38) and terminates the process shown in FIG. 7. If the L-ratio is below the lower limit (S36: NO), the ASIC 71 adds the search width W to the value of X (S39), effectively increasing the PWM value of the control signal LED_PWM by the search width W. The ASIC 71 then re-executes the sampling process in S33.

Accordingly, the ASIC 71 searches for a value of X that satisfies the condition where the L-ratio, which represents the number of times (L-count) the light reception signal level exceeds the third threshold level TH3 out of 120 sampling counts, falls within the range of the lower limit (0.3) or higher and the upper limit (0.7) or lower. The ASIC 71 then sets the value of X that meets this condition as the third adjustment value AV3. Through this process, the ASIC 71 determines the PWM value of the control signal LED_PWM as the third adjustment value AV3 such that it exceeds the target third threshold level TH3 approximately half of the time. It should be noted that the upper and lower limit values described above are merely examples. Additionally, the ASIC 71 may determine the third adjustment value AV3 using only one of either the upper limit or the lower limit.

As shown in FIG. 4, after executing S4, the ASIC 71 determines, in S5, the determination PWM value DT to be used in the color misalignment correction process of S8. The ASIC 71 calculates the determination PWM value DT based on the first adjustment value AV1, the third adjustment value AV3, the first threshold level TH1, and the third threshold level TH3, all of which were determined through the previously described processes.

For example, the determination PWM value DT can be determined using the following equation:

$$DT=AV3+(VT-TH3)\times((AV3-AV1)/(TH3-TH1))$$

In the color misalignment correction process of S8, the ASIC 71 sets the light reception signal level to the target level. The variable VT represents the target signal level of the light reception signal Vout in the color misalignment correction process of S8, which is set to 2.1 V in this embodiment. Using the above equation, the ASIC 71 determines the determination PWM value DT based on the difference between the target level VT and the third threshold level TH3, the difference between the third adjustment value AV3 and the first adjustment value AV1, and the difference between the third threshold level TH3 and the first threshold level TH1.

The ASIC 71, after determining the determination PWM value DT in S5, executes S7 and S8 to perform the color misalignment correction process using the determined determination PWM value DT. The color misalignment correction process can be implemented using well-known techniques, such as those disclosed in prior art documents (e.g., Japanese Unexamined Patent Application Publication No. 2010-256715), and therefore, a detailed description is omitted.

The ASIC 71 is, for example, configured to set black as the reference color and adjust the image formation positions of yellow, magenta, and cyan based on the image formation position of the reference color. In S7, the ASIC 71 forms toner patches for judgment onto the endless belt 63. These toner patches, which are used to determine color misalignment correction, include elongated marks of each color in the main scanning direction. The toner patches consist of multiple sets of four marks, each set arranged in the order of black, yellow, magenta, and cyan, and spaced apart in the sub-scanning direction on the sheet conveyance surface 63A of the endless belt 63.

When the transfer position of an adjustment color deviates from the transfer position of the reference color in the sub-scanning direction, the relative distance between the adjustment color mark and the reference color mark changes. Therefore, in S8, the ASIC 71 calculates the relative distance between each adjustment color mark and the reference color mark for each set. Then, based on the calculation results for all sets, the ASIC 71 determines the average value of the relative distances for each adjustment color.

The ASIC 71 outputs the control signal LED_PWM with the PWM value of the determination PWM value DT, determined in S5, to the light emission adjustment circuit 81, thereby causing the light-emitting diode LED to emit light. Additionally, the ASIC 71 sets the PWM value of the threshold signal TH_PWM so that the threshold voltage TH reaches the target level VT, which is, for example, 2.1 V.

Depending on the presence or absence of marks on the sheet conveyance surface 63A of the endless belt 63, the relationship between the light reception signal level and the threshold level at the target level VT is inverted. Consequently, the comparison result signal SG alternates between High and Low levels. Based on the timing at which the signal level of the comparison result signal SG inverts, the ASIC 71 detects the position of each mark and calculates the average relative distance for each adjustment color.

The ASIC 71 determines the deviation amount in the sub-scanning direction of the transfer position relative to the reference color based on the difference between the calculated average value and a particular ideal value. The ASIC 71 then stores this deviation amount in the sub-scanning direction in the NVRAM 74 (S8). After completing the color misalignment correction process in S8, the ASIC 71 terminates the process shown in FIG. 4.

Subsequently, when executing image formation based on a print job or other operations, the ASIC 71 adjusts the exposure timing of each photoconductor drum 41 corresponding to the adjustment colors so as to compensate for the deviation amount stored in the NVRAM 74. This adjustment eliminates the transfer position misalignment (color misalignment) between the photoconductor drums 41.

As described above, the first embodiment provides the following advantages:

(1) In this embodiment, the ASIC 71 sequentially outputs the control signal LED_PWM, updated from the initial value IV in increments of the search width W, to the light emission adjustment circuit 81. Based on the comparison result signal SG from the comparator circuit 82, the ASIC 71 determines the adjustment value at which the light reception signal level exceeds the threshold level (S2, S3, S4; an example of the light amount adjustment process according to aspects of the present disclosure). When executing each light amount adjustment process, the ASIC 71 sets the initial value IV and the search width W according to the degradation state of the endless belt 63.

With this configuration, when the degradation of the endless belt 63 progresses and the surface gloss of the endless belt 63 decreases, it is possible to adjust by increasing the values of the initial value IV and the search width W. As a result, when searching for the adjustment value at which the light reception signal level exceeds the threshold level, the processing time from the start of the search to the determination of the adjustment value can be reduced. This allows for a quicker determination of the adjustment value.

(2) Additionally, the ASIC 71 sequentially outputs the control signal LED_PWM corresponding to the determination values, in order starting from the smallest of the four determination values (first to fourth determination values JV1 to JV4), to the light emission adjustment circuit 81. The ASIC 71 then determines the initial value IV and the search width W based on the determination value corresponding to the received comparison result signal SG, which indicates that the light reception signal level has exceeded the threshold level (see FIG. 5).

Accordingly, before executing the search for the adjustment value, the ASIC 71 performs the initial value determination process (S1) to determine the initial value IV and the search width W. The ASIC 71 sequentially uses multiple different determination values, starting from the smallest, and when it receives the Low-level comparison result signal SG, which indicates that the light reception signal level has exceeded the threshold level, the ASIC 71 determines the initial value IV and the search width W based on the corresponding determination value. This allows the initial value IV and the search width W to be determined using a determination value that matches the degradation state of the endless belt 63 among the multiple available determination values.

(3) Additionally, the NVRAM 74 stores the values of the search width W (1 to 4) corresponding to each of the first to fourth determination values JV1 to JV4 in proportion to their magnitudes. In the initial value determination process, the ASIC 71 determines the determination value that is immediately before and smaller than the corresponding determination value (S14, S18, S22, S23) as the initial value IV. Furthermore, the ASIC 71 determines the search width W as the value corresponding to the corresponding determination value (S14, S18, S22, S23).

Accordingly, the ASIC 71 performs a search by sequentially using the smaller determination values and determines the initial value IV as the determination value that is immediately before and smaller than the determination value at which the received light signal level exceeds the threshold level. This enables the search to start from a received light signal level that is lower than the threshold level, making it more reliably possible to prevent the received light signal level from exceeding the threshold level at the start of the search.

Additionally, the search width W is set in proportion to the magnitude of the determination value. As a result, by increasing the search width W as the determination value increases, the processing time required from the start of the search to the determination of the adjustment value can be reduced.

(4) Additionally, the ASIC 71, after executing the initial value determination process in S2, sequentially outputs the control signal LED_PWM, updated in increments of the search width W from the initial value IV, to the light emission amount adjustment circuit 81 and determines the adjustment value at which the received light signal level exceeds the threshold level based on the comparison result signal SG (S2, S3, S4). The ASIC 71 determines the adjustment values obtained through the light amount adjustment process (the first adjustment value AV1 and the third adjustment value AV3) as correction adjustment values and outputs the control signal LED_PWM (determination PWM value DT) corresponding to the correction adjustment values to the light emission amount adjustment circuit 81 to correct the color misalignment of the marks formed on the endless belt 63 (S5, S7, S8, an example of the color misalignment correction process in the present disclosure).

Accordingly, the ASIC 71 can reduce the time required to search for adjustment values in each light amount adjustment process by using the initial value IV and the search width W corresponding to the deterioration state of the endless belt 63. The ASIC 71 then outputs the control signal LED_PWM, corresponding to the first adjustment value AV1 and the third adjustment value AV3 (determination PWM value DT) determined in the light amount adjustment process, to the light emission amount adjustment circuit 81 and executes the color misalignment correction process. As a result, the light emission amount from the light-emitting diode LED can be adjusted according to the deterioration state of the endless belt 63, allowing for more precise detection of the marks formed on the endless belt 63 and more accurate execution of the color misalignment correction. Consequently, in the image formation process after correction, it becomes possible to prevent misalignment of transfer positions among the multiple photoconductor drums 41.

(5) Additionally, in the initial value determination process of S2, the ASIC 71 outputs a threshold signal indicating the first threshold level TH1 to the comparator circuit 82 and determines the initial value IV and the search width W based on the first threshold level TH1 (see FIG. 5). After executing the initial value determination process, the ASIC 71 continues to output a threshold signal indicating the first threshold level TH1 to the comparator circuit 82 while sequentially outputting the control signal LED_PWM, updated in steps of the search width W from the initial value IV, to the light emission amount adjustment circuit 81. Based on the comparison result signal SG, the ASIC 71 determines the first adjustment value AV1 as the value where the received light signal level exceeds the first threshold level TH1 (first light amount adjustment process of S2).

After completing the first light amount adjustment process, the ASIC 71 outputs a threshold signal indicating the second threshold level TH2 to the comparator circuit 82 while sequentially outputting the control signal LED_PWM, updated in steps of the search width W from the first adjustment value AV1 (used as the new initial value IV), to the light emission amount adjustment circuit 81. Based on the comparison result signal SG, the ASIC 71 determines the second adjustment value AV2 as the value where the received light signal level exceeds the second threshold level TH2 (second light amount adjustment process of S3).

Following the second light amount adjustment process, the ASIC 71 outputs a threshold signal indicating the third threshold level TH3 to the comparator circuit 82 while outputting the control signal LED_PWM corresponding to the second adjustment value AV2 to the light emission amount adjustment circuit 81, repeating this process 120 times. If the number of times a Low-level comparison result signal SG is received falls within the particular ratio ($0.3 \leq L \leq 0.7$) out of the 120 repetitions, the ASIC 71 determines the second adjustment value AV2 as the third adjustment value AV3 (see FIG. 7). If the L-ratio of the L-count is below 0.3 (S36: NO), the ASIC 71 corrects the second adjustment value AV2 so that the L-ratio becomes 0.3 or greater, thereby determining the third adjustment value AV3 (S39).

Then, based on the first threshold level TH1, the third threshold level TH3, the first adjustment value AV1, and the third adjustment value AV3, the ASIC 71 determines the determination PWM value DT (see the above equation) and outputs the control signal LED_PWM corresponding to the determination PWM value DT to the light emission amount adjustment circuit 81 to correct color misalignment.

Accordingly, the ASIC 71 determines the first adjustment value AV1 by using the initial value IV and the search width W, which were determined in the initial value determination process, along with the first threshold level TH1. This allows the ASIC 71 to reduce the time required to search for the first adjustment value AV1. The ASIC 71 then determines the second adjustment value AV2 as the value where the received light signal level exceeds the second threshold level TH2, using the first adjustment value AV1 as the initial value IV and the search width W determined in the initial value determination process.

Next, the ASIC 71 determines the third adjustment value AV3 using the second adjustment value AV2 and the third threshold level TH3, ensuring that the L-ratio falls within the particular range ($0.3 \leq L \leq 0.7$). Then, based on the first threshold level TH1 and other parameters, the ASIC 71 determines the determination PWM value DT using the above equation and outputs the corresponding control signal LED_PWM to the light emission amount adjustment circuit 81 to execute the color misalignment correction process.

This enables precise adjustment of the emission amount of the light-emitting diode LED according to the degradation state of the endless belt 63. As a result, the corrected image formation process can effectively prevent misalignment in the transfer positions among multiple photoconductor drums 41.

Second Embodiment

Next, the second embodiment of the present application will be described. In the first embodiment described above, both the initial value IV and the search width W were determined according to the degradation state of the endless belt 63 in the initial value determination process shown in FIG. 5. In contrast, in the initial value determination process of the second embodiment shown in FIG. 9, only the search width W is determined based on the degradation state of the endless belt 63. This is the primary difference from the first embodiment.

In the following description, components that are the same as those in the first embodiment are denoted by the same reference numerals, and redundant explanations will be omitted as appropriate.

Figure 9:
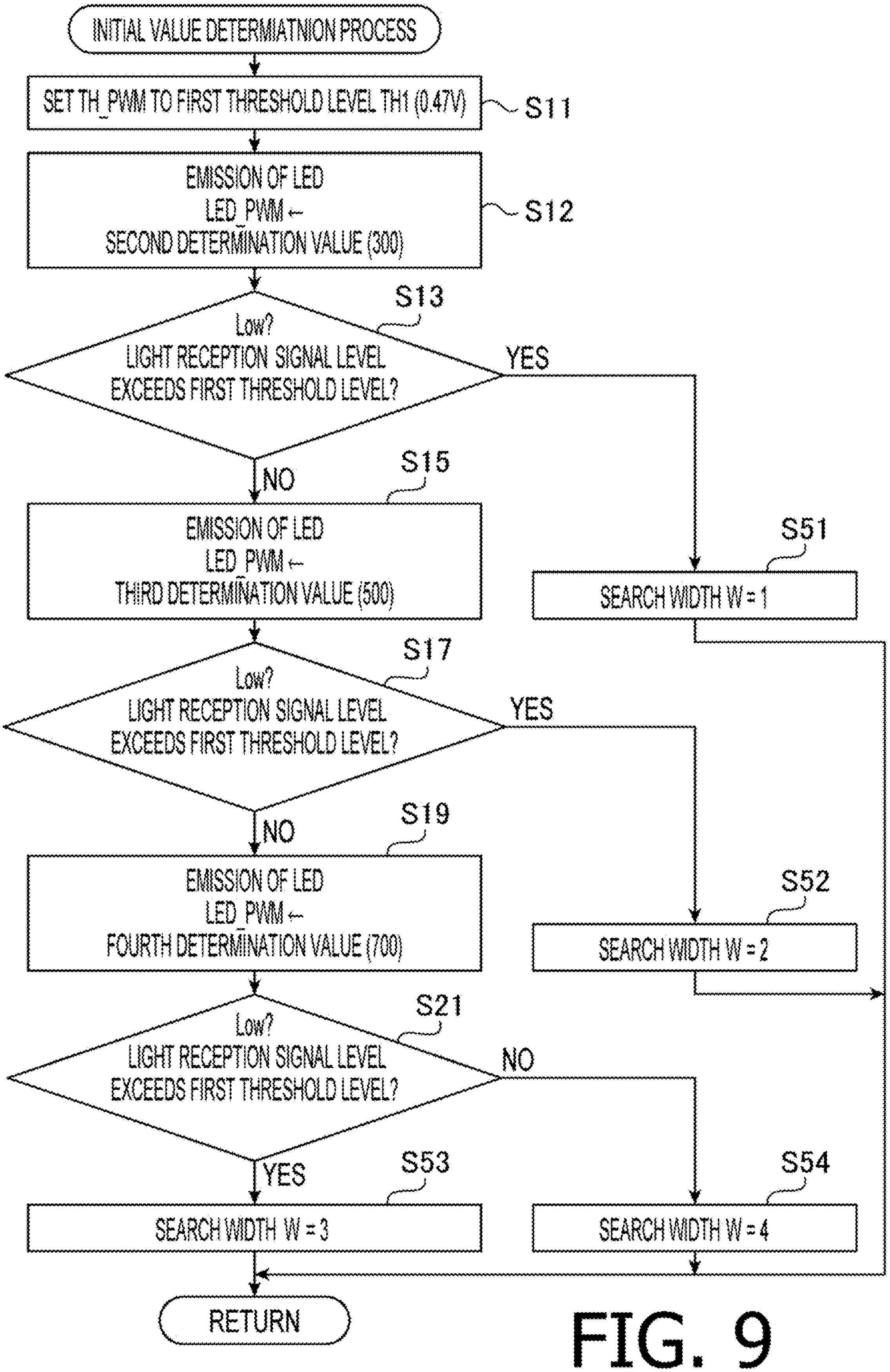
FIG. 9 is a flowchart illustrating another initial value determination process.

As shown in S51 of FIG. 9, when the received light signal level exceeds the first threshold level TH1 (S13: YES), the ASIC 71 determines the search width W as 1. Similarly, as the received light signal level does not exceed the first threshold level TH1 and the determination value increases, the ASIC 71 gradually increases the search width W (S52, S53, S54). The ASIC 71 increases the search width W as the determination value becomes larger, meaning that the more the endless belt 63 deteriorates, the larger the search width W becomes.

In the second embodiment, the ASIC 71 determines the initial value IV to be 150, for example, during the initial value determination process, which is later used in the first light amount adjustment process. That is, among the values selected as the initial value IV in the first embodiment, the smallest value is set as the initial value IV. As shown in FIG. 6, in the case where the initial value determination process of the first embodiment is executed, the processing time required to determine the first adjustment value AV1 is shortened by increasing the search width W as the initial value IV increases. On the other hand, in the case where the initial value determination process of the second embodiment is executed, the initial value IV is set to 150 regardless of the deterioration state of the endless belt 63, and the search is executed from point P2. However, the ASIC 71 increases the search width W as the deterioration of the endless belt 63 progresses. As a result, even if the first adjustment value AV1 becomes larger due to the deterioration of the endless belt 63, the processing time required to determine the first adjustment value AV1 can be shortened by increasing the search width W.

According to the second embodiment described above, the same effects as those of the first embodiment can be achieved. In addition, the second embodiment provides the following effect.

In the initial value determination process, the ASIC 71 of the second embodiment determines a common value (i.e., 150) as the initial value IV for each of the plurality of determination values and determines the search width W corresponding to the relevant determination value. With this configuration, the initial value IV used for the search remains unchanged, while the search width W is adjusted. By using a search width W proportional to the magnitude of the determination value, the search width W can be increased in accordance with the progress of the deterioration of the endless belt 63. As a result, the processing time required to determine the first adjustment value AV1 from the start of the search can be shortened.

Third Embodiment

Next, a third embodiment of the present application will be described. In the first embodiment described above, the initial value determination process shown in FIG. 5 uses the first threshold level TH1 as the threshold level. However, this is not a limitation. In cases where only the search width W is determined, as in the second embodiment, the threshold level used in the initial value determination process can be set to an arbitrary threshold level. In this case, the second to fourth determination values JV2 to JV4 are modified according to the magnitude of the threshold level used in the initial value determination process (i.e., the threshold voltage TH).

Figure 10:
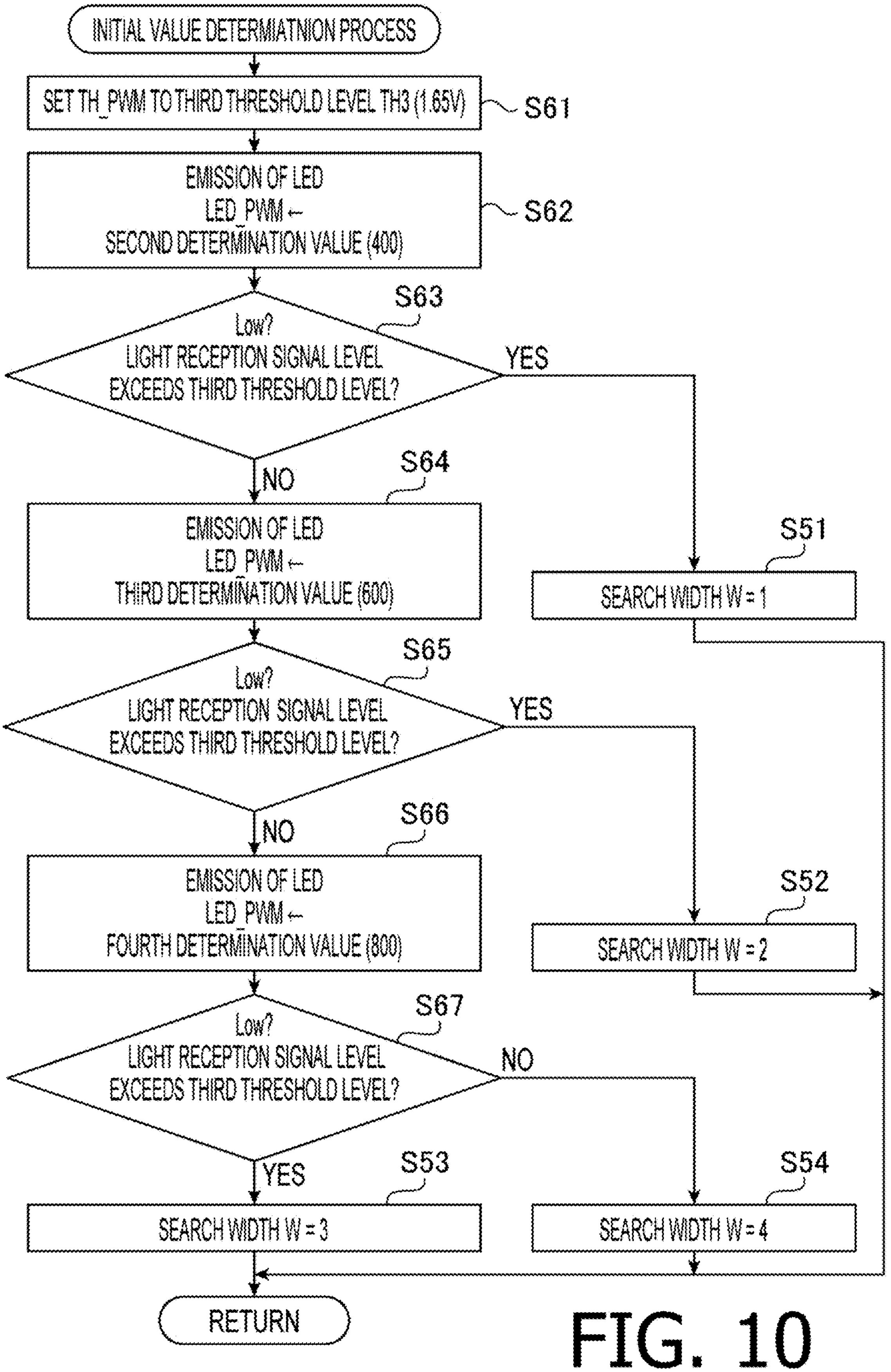
FIG. 10 is a flowchart illustrating another initial value determination process.

In the initial value determination process of the third embodiment shown in FIG. 10, the threshold level is set to, for example, the third threshold level TH3 (1.65 V). Additionally, the second to fourth determination values JV2 to JV4 are adjusted according to the third threshold level TH3. These aspects differ from the second embodiment. For components that are the same as those in the second embodiment, the same reference numerals are used, and explanations are omitted as appropriate. Furthermore, in the third embodiment, the initial value IV is not determined in the initial value determination process, and only the search width W is determined. Therefore, the first determination value JV1 is not used.

As shown in FIG. 10, when the ASIC 71 starts the initial value determination process, it first sets the PWM value of the threshold signal TH_PWM to a value such that the threshold voltage TH corresponds to the third threshold level TH3 (1.65 V) (S61).

Accordingly, the second to fourth determination values JV2 to JV4 in the third embodiment are set to values converted from the second to fourth determination values JV2 to JV4 (300, 500, 700) used in the first embodiment when the first threshold level TH1 (0.47 V) was used as the threshold level, to values corresponding to the case where the third threshold level TH3 (1.65 V) is used as the threshold level. Specifically, the second to fourth determination values JV2 to JV4 are set to 400, 600, and 800, respectively.

In this case, each of the second to fourth determination values JV2 to JV4 in the first embodiment is increased by 100 in terms of PWM value. The values of the second to fourth determination values JV2 to JV4 mentioned above are merely examples, and these values may be appropriately modified according to the magnitude of the threshold level used in the initial value determination process or the types and values of the search width W to be determined.

After executing S61, the ASIC 71 sets the PWM value of the control signal LED_PWM to the second determination value JV2 (400) and causes the light-emitting diode LED to emit light (S62). Then, the ASIC 71 determines whether the received light signal level exceeds the third threshold level TH3 (S63). If the received light signal level exceeds the third threshold level TH3 (S63: YES), the ASIC 71 sets the search width W to 1 (S51).

On the other hand, if the received light signal level does not exceed the third threshold level TH3 (S63: NO), the ASIC 71 sets the PWM value of the control signal LED_PWM to the third determination value JV3 (600) and causes the light-emitting diode LED to emit light (S64). Then, the ASIC 71 determines whether the received light signal level exceeds the third threshold level TH3 (S65). If the received light signal level exceeds the third threshold level TH3 (S65: YES), the ASIC 71 sets the search width W to 2 (S52).

Similarly, if the ASIC 71 makes a negative determination in S65 (S65: NO), it sets the PWM value to the fourth determination value JV4 (800) (S66), evaluates the received light signal level (S67), and sets the search width W according to the evaluation result (S53 or S54). In this manner, by using a threshold level other than the first threshold level TH1 and setting the determination values according to the modified threshold level, the search width W can be determined.

Fourth Embodiment

Next, a fourth embodiment of the present disclosure will be described. In the first embodiment, both the initial value IV and the search width W were determined according to the deterioration state of the endless belt 63 in the initial value determination process. In contrast, the initial value determination process of the fourth embodiment differs from that of the first embodiment in that only the initial value IV is changed according to the deterioration state of the endless belt 63. That is, unlike the second embodiment, only the initial value IV, rather than both the initial value IV and the search width W, is changed according to the deterioration state.

To explain using FIG. 5 of the first embodiment, the ASIC 71 determines the initial value IV as the first determination value JV1 in S14, the second determination value JV2 in S18, the third determination value JV3 in S22, and the fourth determination value JV4 in S23. However, the search width W is not changed. In this case, the ASIC 71 determines the search width W to be used in the light amount adjustment process from S3 onward, for example, as 1 in the initial value determination process. That is, among the selectable values for the search width W in the first embodiment, the smallest value is set. In this case, in the first light amount adjustment process and other related processes, the search width W is set to 1 regardless of the magnitude of the initial value IV, and the first adjustment value AV1 is searched accordingly. Note that the search width W may be set to other values, and different values may be assigned to the search width W for each light amount adjustment process.

According to the fourth embodiment described above, the same effects as in the first embodiment can be achieved. In addition, the fourth embodiment provides the following effects.

In the initial value determination process, the ASIC 71 determines a common value (i.e., 1) as the search width W for each of the multiple determination values. Furthermore, the ASIC 71 determines the initial value IV to be a value equal to or greater than the determination value immediately before and smaller than the corresponding determination value.

With this configuration, the search width W used for the search is not changed, while the initial value IV is adjusted. By determining the initial value IV as the determination value immediately before and smaller than the determination value at which the received light signal level exceeds the first threshold level TH1, it becomes more certain that the received light signal level does not exceed the threshold level at the start of the search. Additionally, the initial value IV can be set according to the deterioration state of the endless belt 63.

Aspects of the present disclosure are not limited to the embodiments described above, and various modifications can be made without departing from its scope.

For example, in the above embodiments, the description focused on modifying the initial value IV and the search width W when executing color misalignment (registration). However, these parameters may also be modified when adjusting the light emission amount of the light-emitting diode LED in other processes. For instance, when performing density correction by emitting light from the LED, the ASIC 71 may determine the initial value IV and other parameters according to the deterioration state of the endless belt 63. The determined initial value IV and related parameters may then be used to determine the first adjustment value AV1, adjust the LED's light emission amount, and perform density correction with the adjusted emission amount.

Additionally, while the ASIC 71 executes the first, second, and third light amount adjustment processes, it is possible to execute at least one of these processes instead of all three. Accordingly, the ASIC 71 may determine the determination PWM value DT using at least one of the first adjustment value AV1, second adjustment value AV2, or third adjustment value AV3.

Furthermore, similar to the third light amount adjustment process, the ASIC 71 may execute a process after the first light amount adjustment process in which the first adjustment value AV1 is used to determine the received light signal level for a particular number of sampling cycles. Based on a particular ratio of received light signal levels exceeding the threshold level, the ASIC 71 may execute a light amount adjustment process to determine the adjustment value.

Moreover, while the above embodiments determine the deterioration state of the endless belt 63 based on the received light signal level, this is not the only approach. For example, the ASIC 71 may determine that the deterioration of the endless belt 63 has progressed based on an increase in the cumulative number of printed sheets in the printer 10. In this case, the initial value IV and the search width W may be increased accordingly.

Additionally, in the above embodiments, the image forming apparatus of the present application employs a so-called direct tandem system, in which each developing cartridge 33 is arranged along the conveyance direction within a particular range on the conveyance path 17 of the sheet S. However, the image forming apparatus of the present application is not limited to this configuration. For example, an image forming apparatus that adopts an intermediate transfer system, in which a toner image is transferred onto the sheet S via an intermediate transfer belt, may also be employed. In this case, the intermediate transfer belt is an example of the endless belt in the present application.

Furthermore, in the above embodiments, a color laser printer is adopted as the image forming apparatus of the present application. However, the present image forming apparatus is not limited to this type. It may also be a multifunction device equipped with multiple functions such as printing, copying, faxing, and scanning.

While aspects of the present disclosure have been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting aspects of the present disclosure. Various changes may be made without departing from the spirit and scope of aspects of the present disclosure. Therefore, the disclosure is intended to embrace all known or later developed alternatives, modifications, variations, improvements, and/or substantial equivalents.

What is claimed is:

1. An image forming apparatus comprising:
a plurality of photoconductor drums;
an endless belt arranged at a position facing the plurality of photoconductor drums;
a sensor including a light-emitting unit configured to emit light toward the endless belt and a light-receiving unit configured to receive light reflected by the endless belt;
a light emission adjustment circuit configured to change a light emission amount emitted from the light-emitting unit in response to an input of a control signal indicating an adjustment value;
a comparator circuit configured to compare a light reception signal level corresponding to a received light amount of the light-receiving unit with a threshold level, and to output a comparison result signal indicating that the light reception signal level exceeds the threshold level; and
a controller having hardware,
wherein the controller is configured to perform a light amount adjustment process of sequentially outputting the control signals with updating the adjustment value from an initial value by a search width, and determining, based on the comparison result signal, the adjustment value the light reception signal level exceeds the threshold level, and
wherein, when executing the light amount adjustment process, the controller is configured to set at least one of the initial value or the search width according to a deterioration state of the endless belt.

2. The image forming apparatus according to claim 1,
wherein the controller is configured to perform an initial value determination process of sequentially outputting, to the light emission adjustment circuit, the control signals corresponding to determination values in order, starting with a smallest determination value among the determination values different from each other, receiving the comparison result signal from the comparator circuit, and, in a case where the comparison result signal is received, determining the initial value or the search width based on a particular determination value corresponding to the received comparison result signal.

3. The image forming apparatus according to claim 2,
wherein the controller is configured to set the search width corresponding to each of the determination values in proportion to magnitude each of the determination values,
wherein, in the initial value determination process, the controller is configured to:
determine a determination value immediately before and smaller than the particular determination value as the initial value; and
determine a value corresponding to the particular determination value as the search width.

4. The image forming apparatus according to claim 2,
wherein the controller is configured to set the search width corresponding to each of the determination values in proportion to magnitude each of the determination values,
wherein, in the initial value determination process, the controller is configured to:
determine a common value for each of the plurality of the determination value as the search width; and
determine a value corresponding to the particular determination value as the search width.

5. The image forming apparatus according to claim 2,
wherein, in the initial value determination process, the controller is configured to:
determine a common value for each of the plurality of the determination value as the search width; and
determine a determination value immediately before and smaller than the particular determination value as the initial value.

6. The image forming apparatus according to claim 2,
wherein, after performing the initial value determination process, the controller is configured to perform:
a light amount adjustment process of sequentially outputting the control signals with updating the adjustment value from the initial value by the search width to the light emission adjustment circuit, and determining the adjustment value that the light reception signal level exceeds the threshold level based on the comparison result signal, and
a correction process of determining the adjustment value determined by the light amount adjustment process as a correction adjustment value, outputting a control signal corresponding to the correction adjustment value to the light emission adjustment circuit to correct color misalignment of a mark formed on the endless belt.

7. The image forming apparatus according to claim 2,
wherein the threshold level is adjustable, a first threshold level, a second threshold level, and a third threshold level being set as the threshold level,
wherein the controller is configured to perform:
outputting a threshold signal indicating the first threshold level to the comparator circuit in the initial value determination process to determine the initial value or the search width based on the first threshold level;
a first light amount adjustment process of sequentially outputting the control signals with updating the adjustment value from the initial value by the search width to the light emission adjustment circuit while outputting the threshold signal indicating the first threshold level to the comparator circuit after the initial value determination process has been performed, and determining a first adjustment value that the light reception signal level exceeds the first threshold level based on the comparison result signal;
a second light amount adjustment process of sequentially outputting the control signals with updating the adjustment value from the first adjustment value as the initial value by the search width to the light emission adjustment circuit while outputting a threshold signal indicating the second threshold level to the comparator circuit after the first light amount adjustment process has been performed, and determining a second adjustment value that the light reception signal level exceeds the second threshold level based on the comparison result signal;
a third light amount adjustment process of repeatedly outputting the control signals corresponding to the second adjustment value to the light emission adjustment circuit for a particular number of times while outputting a threshold signal indicating the third threshold level to the comparator circuit after the second light amount adjustment process has been performed, determining the second adjustment value as a third adjustment value in a case where the number of times the comparison result signals are received exceeds a particular ratio of the particular number, and determining the third adjustment value by adjusting the second adjustment value in such a manner that the particular ratio or more of the light reception signal level exceed the third threshold level in a case where the number of times the comparison result signals are received does not exceed the particular ratio; and a color misalignment correction process of determining a correction adjustment value based on the first threshold level, the third threshold level, the first adjustment value, and the third adjustment value, outputting a control signal corresponding to the correction adjustment value to the light emission adjustment circuit to correct color misalignment of a mark formed on the endless belt.

* * * * *